United States Patent

Snider et al.

[11] Patent Number: 6,154,174
[45] Date of Patent: Nov. 28, 2000

[54] LARGE APERTURE VIBRATION COMPENSATED MILLIMETER WAVE SENSOR

[75] Inventors: Robin Terry Snider, Fallbrook; Terry Lee Rhodes, Del Mar; Edward Joseph Doyle, San Diego, all of Calif.

[73] Assignee: General Atomics, San Diego, Calif.

[21] Appl. No.: 09/295,083

[22] Filed: Apr. 20, 1999

[51] Int. Cl.[7] .................................................. H01Q 3/22
[52] U.S. Cl. ..................... 342/371; 342/375; 343/754; 343/779
[58] Field of Search .................................... 342/352, 371, 342/375; 343/720, 721, 722, 753, 754, 755, 779

[56] References Cited

U.S. PATENT DOCUMENTS

| | | | |
|---|---|---|---|
| 4,476,471 | 10/1984 | Sato et al. | 343/779 |
| 4,588,994 | 5/1986 | Tang et al. | 343/754 |
| 5,148,182 | 9/1992 | Gautier et al. | 343/754 |

*Primary Examiner*—Gregory C. Issing
*Attorney, Agent, or Firm*—Fitch, Even, Tabin & Flannery

[57] ABSTRACT

A millimeter wave imaging system includes a plurality of millimeter wave radiometer elements disposed in a sparse antenna array integrated into a lower surface of an airborne vehicle. The antenna elements preferably form a cross or T-shaped sparse array. Images are formed using interferometric techniques. Each radiometer element includes a receive antenna coupled to an electronic mirror which provides beam steering. To compensate for deflection of the airborne vehicle, a mechanical deflection measurement system is provided. Additional radiometer elements having transmitter antenna elements may be integrated into the sparse array to provide active illumination to enhance image formation and to operate as target designators.

27 Claims, 10 Drawing Sheets

(a) Visible photo of scene including model airplanes and a compact car,
(b) same scene at 37 GHz taken with a sparse "T" array and inverted using far-field algorithm,
(c) same data as (b) but inverted with near-field algorithm.

Fig. 8

Schematic illustrating concept of beam-steering array. Non-linear varactor diodes are monolithically integrated with antennas and bias lines on a GaAs wafer to produce a variable impedance surface. The bias lines allow introduction of a progressive phase shift across the array surface that can be utilized for beam-steering and focusing.

Fig. 7

Metal grid with variable gap spacing leading to a variable impedance surface capable of beam deflection.

Photograph of unit cell of fabricated BNN diode array.

Fig. 10

(a) Diode array

ERIM's Algorithm Detects Moving Targets in a Conventional SAR Image.
(a) SAR image including moving TEL and flatbet truck.
(b) Detection results: red indicated moving target energy, blue is fixed background.

DATA STREAM PATH AND PROCESSOR ARCHITECTURE FOR THE DOWNWARD-LOOKING SUBSYSTEM the use of small antennas (approximately millimeters in diameter). For apertures of more than a few meters, this means thousands of receiver antenna elements are necessary in order to maintain acceptable grating lobe levels and sensitivity. Because of the cost, weight, power and computational load (computations scale as the square of the number of receiver elements), such a millimeter wave sparse aperture system has been impractical to build and operate.

LARGE APERTURE VIBRATION COMPENSATED MILLIMETER WAVE SENSOR

BACKGROUND OF THE INVENTION

This invention relates to millimeter wave radiometers, and more particularly to a lightweight, low power, large aperture millimeter wave radiometer with active image width control and vibration compensation for use in an airborne millimeter wave targeting and imaging sensor system.

It has long been recognized that millimeter wave sensors have the potential to play an important role in an aircraft-based all weather, day/night surveillance and reconnaissance system. Such a system detects passive microwave radiation emitted from objects on the ground and uses them to form an image of the area. Existing systems employ electro-optic (EO), infrared (IR) and synthetic aperture radar (SAR) technology, with SAR generally providing the best all weather capability. Conventional SAR systems have several drawbacks, however, principally shadowing and the limitation of being unable to look at or near nadir.

Frequently, a surveillance and reconnaissance system will include active microwave radiation sensing. An active microwave sensor receives the backscattering which is reflected from a transmitted microwave beam which is incident on the ground surface. Depending on the size of the transmitted microwave beam, an active microwave sensor can be used to provide an enhanced image of an area or for target designation. For target designation, a microwave signal is formed into a small beam and used to illuminate a specific target which can be followed by an advanced ordnance onto the target. Conventional SAR cannot be used as an all weather target designator due to the limitations of forming a real beam on the ground with a small antenna. A downward-looking millimeter wave (MMW) imaging system could fill in the operational holes in current sensor suites.

However, MMW imaging systems have suffered from a number of limitations, primarily, a combination of size, weight, power and frame rate limitations. Also, because of the need to have a long wavelength and thus large area apertures, MMW imaging systems have limited ground spatial resolution. Large, thinned arrays mounted on the airframe of a reconnaissance aircraft address some of these issues, but suffer from poor signal to noise ratio and the effects of wing motion.

To successfully function as a good all-weather imaging and targeting sensor system, a millimeter wave imaging system must simultaneously satisfy three competing requirements. First, the system must have adequate scene contrast. Adequate scene contrast for a passive system means small temperature sensitivity $\Delta T$, and for an illuminated (or active) system, a high signal to noise ratio. Second, the system must have adequate spatial resolution with acceptable point spread function (PSF) and side lobe levels. Grating lobes are a major issue in achieving a given resolution without ghosting. Finally, the system must have adequate field of regard (FOR).

Simultaneously meeting these requirements in a millimeter wave sparse aperture system for surveillance applications has proved difficult in the past. Obtaining a wide, instantaneous field of view (FOV) at millimeter wavelengths requires the use of small antennas (approximately millimeters in diameter). For apertures of more than a few meters, this means thousands of receiver antenna elements are necessary in order to maintain acceptable grating lobe levels and sensitivity. Because of the cost, weight, power and computational load (computations scale as the square of the number of receiver elements), such a millimeter wave sparse aperture system has been impractical to build and operate.

Thus, there is a need for a millimeter wave imaging system having small temperature sensitivity and high signal to noise ratio. There is a need for a millimeter wave imaging system which allows a relatively small number of large individual antenna elements in the array while retaining a large total field of regard. There is a need for a millimeter wave imaging system which compensates for motion of the airborne vehicle. There is a need for a millimeter wave imaging system which can accommodate active imaging. There is a need for a millimeter wave imaging system which includes a target designator subsystem having adequate spatial resolution with acceptable point spread function and side lobe levels. There is a need for a millimeter wave imaging and target designation system having an adequate field of regard.

SUMMARY OF THE INVENTION

A millimeter wave imaging system according to the invention simultaneously satisfies the competing requirements of adequate scene contrast, spatial resolution with acceptable point spread function and side lobe levels and adequate field of regard. The millimeter wave imaging system provides advanced beam steering and beam phase control, motion compensation techniques and advanced processor techniques. The millimeter wave imaging system provides all weather capability using a sparse array antenna with fewer antenna elements, thus reducing size and weight limitations. The millimeter wave imaging system can be configured as a downward looking imaging system with both active and passive imaging. The active imaging elements can also be operated as a target designator system.

The millimeter wave imaging system includes a plurality of millimeter wave radiometer elements arranges in a sparse antenna array. Each millimeter wave radiometer element includes a detector disposed within a horn antenna for detecting millimeter wave radiation and a receiver, responsive to the detector, for generating a receive signal. An electronic mirror provides beam steering of the millimeter wave radiation into the horn antenna. The electronic mirror includes an array of inductance and capacitance elements connected in series and disposed on a surface of the electronic mirror. A circuit varies the reactance of the LC array, thus controlling the phase of the millimeter wave radiation. A controller correlates the received signals and generates an image corresponding to the received millimeter wave radiation.

Preferably, the millimeter wave radiometer elements forming the sparse antenna array are integrated into a lower surface of an airborne vehicle. The antenna elements preferably form a cross or T-shaped sparse array. Images are formed using interferometric techniques. The combination of receiver antenna element and electronic mirror for providing beam steering enables the individual antenna elements to be relatively large, thus reducing the number of required elements, while retaining a large total field of regard.

To compensate for deflection of the airborne vehicle, such as would be experienced by radiometer elements mounted on the wing of an aircraft, a mechanical deflection measurement system is provided. Adjacent radiometer elements are preferably mounted on rigid, non load-bearing bars. The rigid non load-bearing bars are coupled to strain gages which measure the gross wing motion. This gives a continuous first order deflection. Intrinsic interferometric fringes in the cross-correlated millimeter wave data between radiometer elements are used to resolve final small scale motion.

To provide enhanced poor weather capability, additional radiometer elements having antenna transmitter elements can be incorporated into the sparse array antenna for active image sensing. The millimeter wave imaging system can thus be operated in both the active (illuminated) and passive modes of operation. The use of active imaging exploits the difference in target (or area) signatures between the passive and illuminated images and provides enhanced image detection during poor weather conditions. Active operation can also be used to designate identified targets. The electronic mirrors can be operated both to steer the received signals and to steer and change the phase front of the transmitter millimeter wave in order to focus on a target.

The millimeter wave imaging system may be used in a stationary orbit vehicle or in a reconnaissance vehicle. The millimeter wave imaging system is preferably mounted on an airborne vehicle, such as a reconnaissance aircraft. Temperature sensitivity for a passive interferometric imaging system located on an airborne vehicle depends on operational parameters such as altitude of the vehicle, ground speed of the vehicle, the required total system field of regard, as well as design factors for the total array diameter. To compensate for temperature sensitivity, a single data set from a synthetic aperture system can be processed with variable (adaptive) spatial and temperature resolution. This takes advantage of the inherent contrast in the millimeter wave in some targets of interest, such as vehicles.

The invention provides several advantages. In a conventional system, the diameter of the antenna elements is selected to be less than the ratio of the wavelength to the total field of regard, which is less than one. In the system of the invention, the diameter of the individual antenna elements is chosen to be much larger than the ratio of the wavelength to the total field of regard, resulting in a decrease in temperature sensitivity and an increase in system performance. Use of large individual antenna elements results in an order of magnitude fewer number of components, reducing cost, complexity, power, weight and computing requirements to acceptable levels.

Ghost images or grating lobes are minimized by employing a linear filled antenna array with hundreds of receiver elements. Use of a linear filled array reduces the instantaneous field of view (FOV) and provides good fill factors which eliminate grating lobe problems, and provides good synthesized beam properties, i.e., acceptable point spread function and low side lobe levels. The smaller instantaneous FOV also significantly reduces the fringe washing problem and subsequent RF bandwidth limitations as compared to a conventional sparse aperture design.

With large antennas, minimum spacing is not $\lambda/2$, but rather a spacing of one half the antenna dimension. Required full FOR is recovered by beam-steering using electronic mirrors (one for each antenna element). Use of electronic mirrors allows control of imaging properties based on the weather or tactical conditions that may exist at any particular time, and adds the sophistication necessary for a successful application to a wide range of surveillance conditions.

The millimeter wave imaging system requires fewer individual antenna elements. By electronically steering the receiver (and transmitter) elements, with the electronic mirrors, the total number of receiver elements is considerably reduced. High spatial resolution is achieved with a sparse array antenna having a large total antenna aperture. Weight and power requirements are reduced by employing a sparse interferometric imaging approach. A large FOR is achieved by using electronic mirrors with large individual aperture antennas. Power, computational, weight and cost constraints are achieved by employing an order of magnitude fewer receiver elements.

BRIEF DESCRIPTION OF THE DRAWINGS

FIG. 3 is an operational diagram of the airborne vehicle shown in FIG. 1;

DETAILED DESCRIPTION OF THE PREFERRED EMBODIMENT

Figure 1:
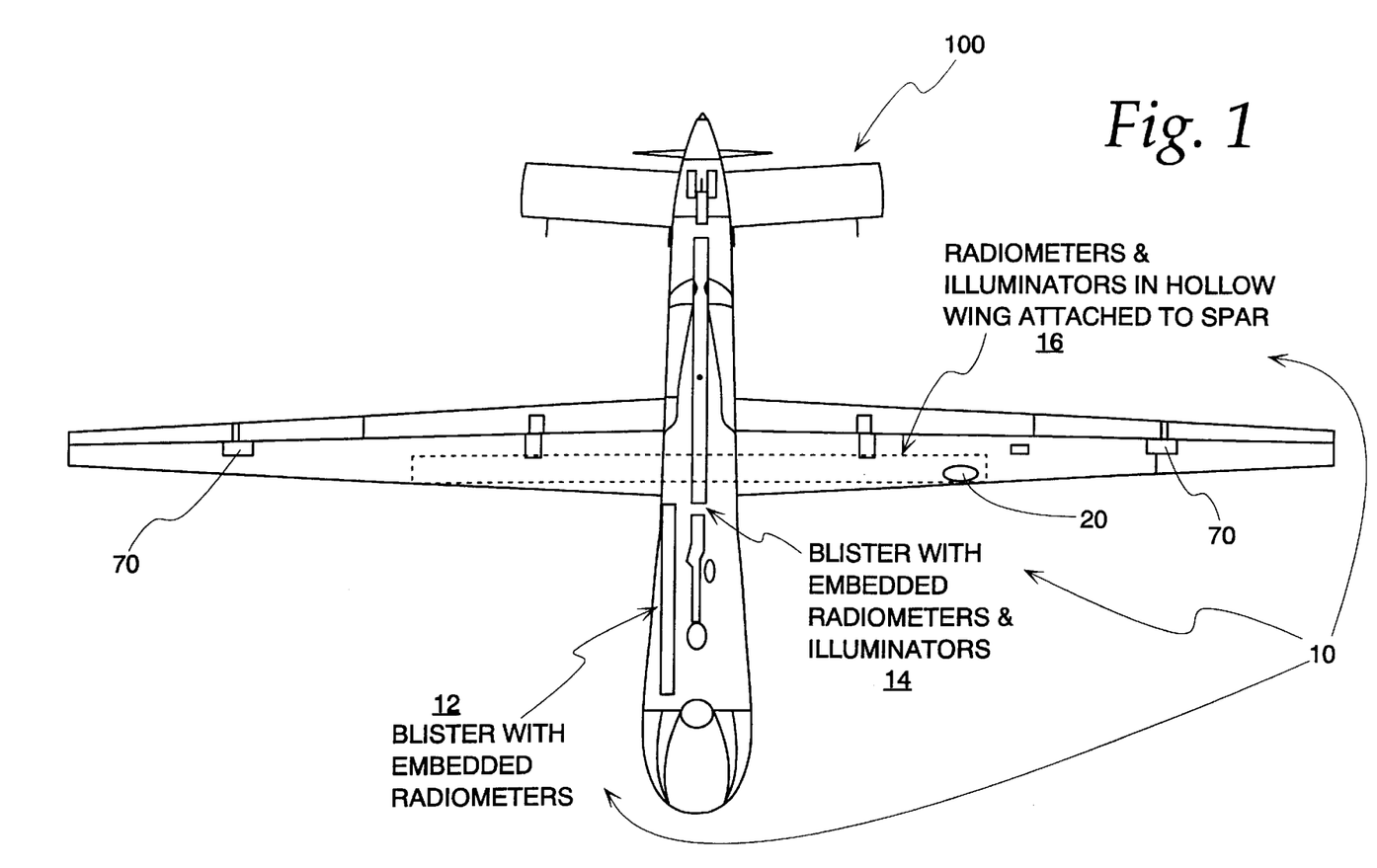
FIG. 1 is a plan view of a millimeter wave imaging system according to the invention installed on an aircraft.

Referring now to the drawings and especially to FIG. 1, a millimeter wave targeting and imaging sensor system is generally shown therein and referred to by numeral 10. MMW targeting and imaging sensor system 10 includes a plurality of individual millimeter wave radiometer elements which are mounted as a sparse antenna array on the underside of an aerial platform 100, which is shown as an unmanned aerial vehicle (UAV). The radiometer elements form a T-shaped or cross-shaped array, with elements mounted along the fuselage at sections 12 and 14 and along the wing at section 16. Groups of radiometer elements are mounted in clusters 20. The majority of the radiometer elements are configured as receivers and comprise a downward looking subsystem. To enhance imaging and to provide target designation, additional radiometer elements are configured as transmitters (illuminators).

Mechanical motion detectors 70 are located near the ends of the wings of the UAV 100. Preferably mechanical motion detectors 70 are strain gages which measure the deflection of the UAV wing tips during flight. By knowing the location of each radiometer element from the wing tip and the distance of the motion detector from the fuselage, the proportionate deflection of each sensor cluster 20 can be calculated and this value used to correct the resultant image.

Figure 2:
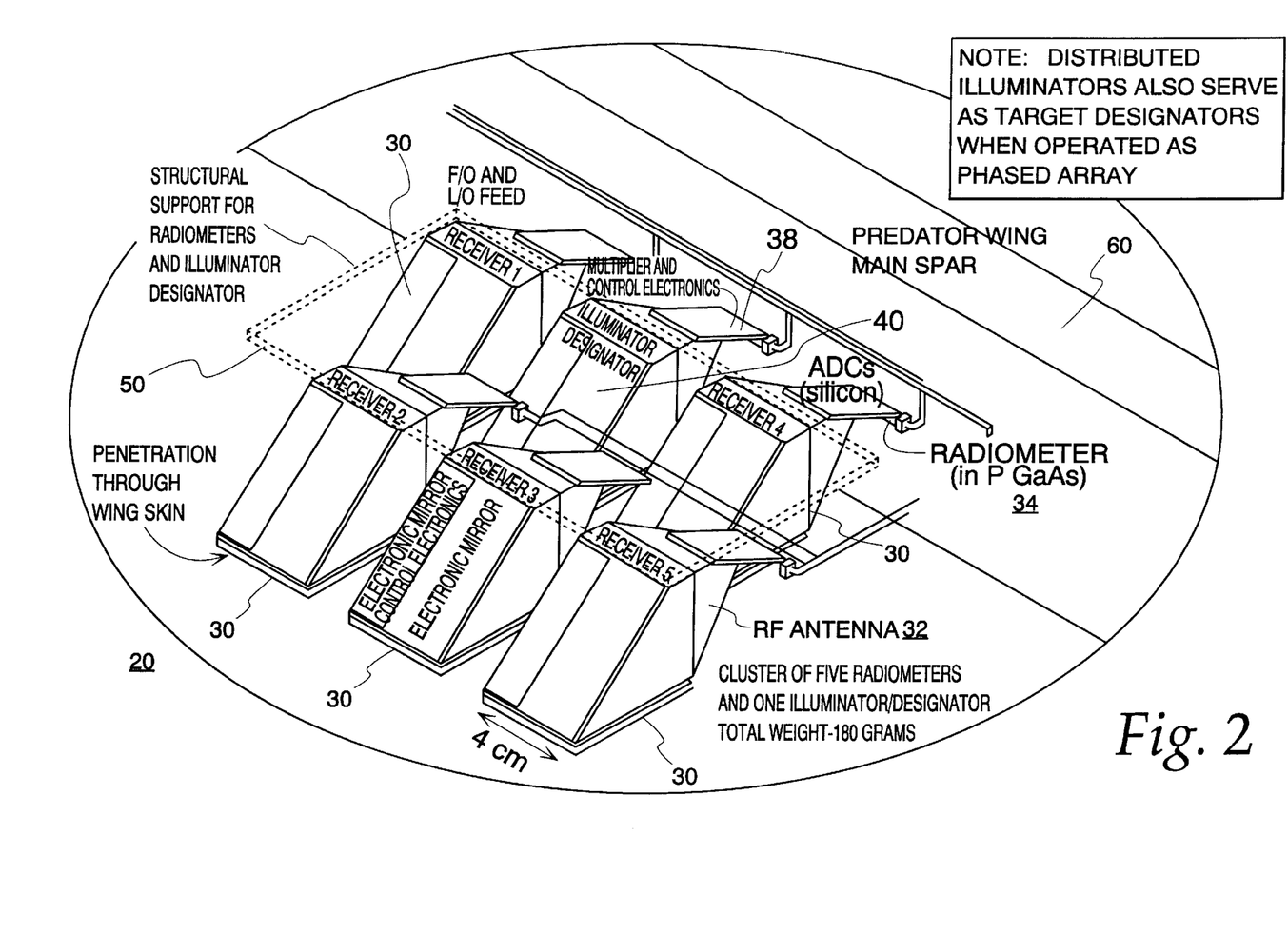
FIG. 2 is a detail of a cluster of six radiometer elements shown in FIG. 1, with FIG. 2a being a detail of an individual antenna.

Preferably, radiometer elements configured as receiver elements and radiometer elements configured as illuminator elements are included in the sparse array antenna. Referring to FIG. 2, a cluster 20 of radiometer elements includes five radiometer elements 30 configured with receiver antenna and one radiometer element 40 configured with an illuminator antenna. The illuminator elements are used both for active imaging and for target designation. Elements 30 and 40 are attached to rigid, non load-bearing support 50. Elements 30 and 40 are mounted such that each individual antenna horn faces downward through the wing skin toward the earth as the UAV 100 travels. Support 50 is attached to a structural member of UAV 100, such as main wing spar 60.

Figures 2A, 3:
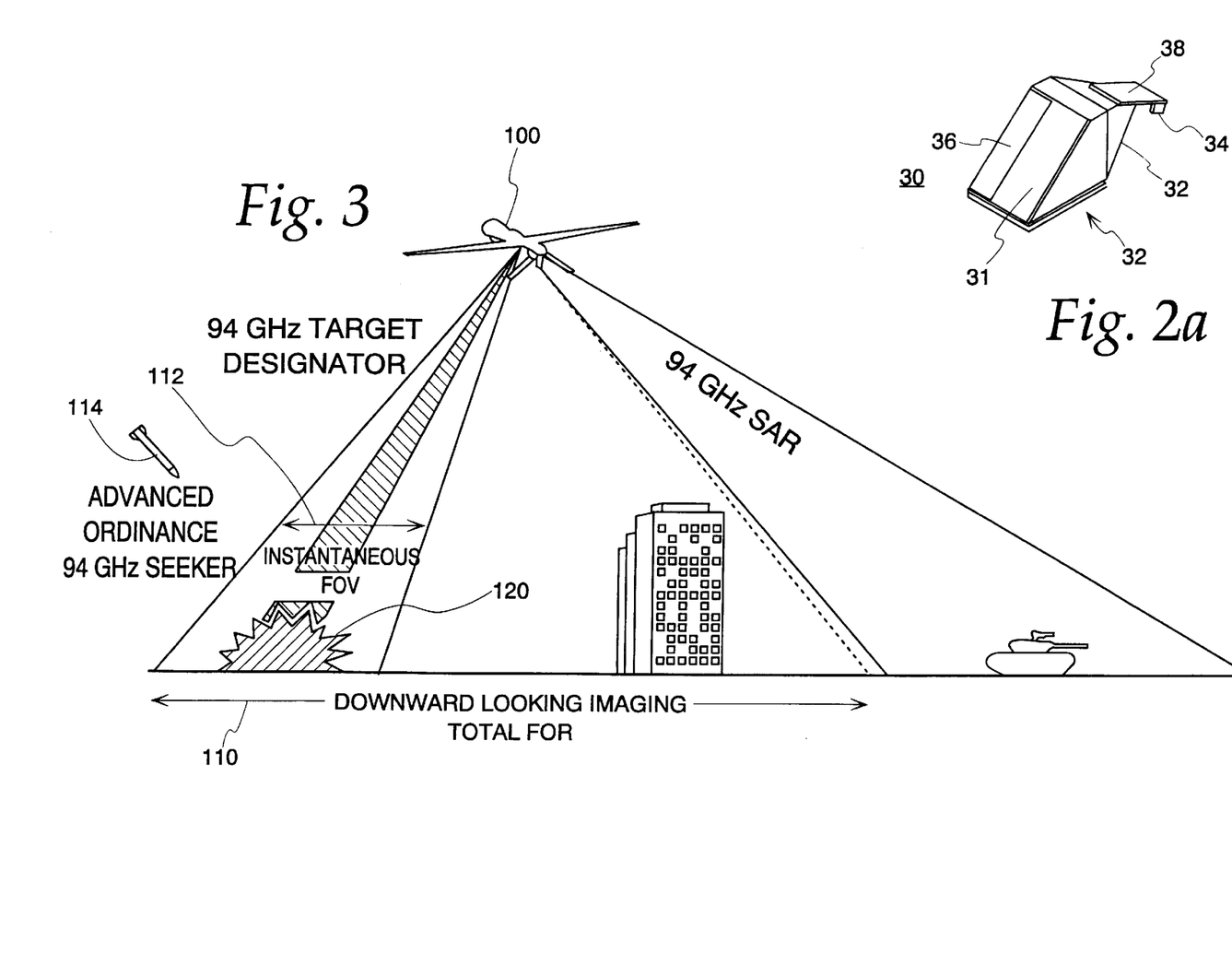

A receiver element 30 is shown in FIG. 2a. Each receiver Element 30 includes a generally rectangular shaped horn antenna which looks downward toward the earth. Received passive radiation from the earth or image area is received by electronic mirror 31. Electronic mirror 31 is controlled by electronic mirror control electronics 36 which steers the received radiation into horn antenna 32. A receiver in multiplier and control electronics 38 generates a receive signal representative of the received radiation. Multiplier and control electronics 38 provides the amplified signal to a microprocessor which correlates all received signals and generates an image. Each transmitter (illuminator) element 40 is similarly configured with the multiplier and control electronics 38 including a signal generator to transmit MMW radiation from horn antenna 32.

Figure 4:
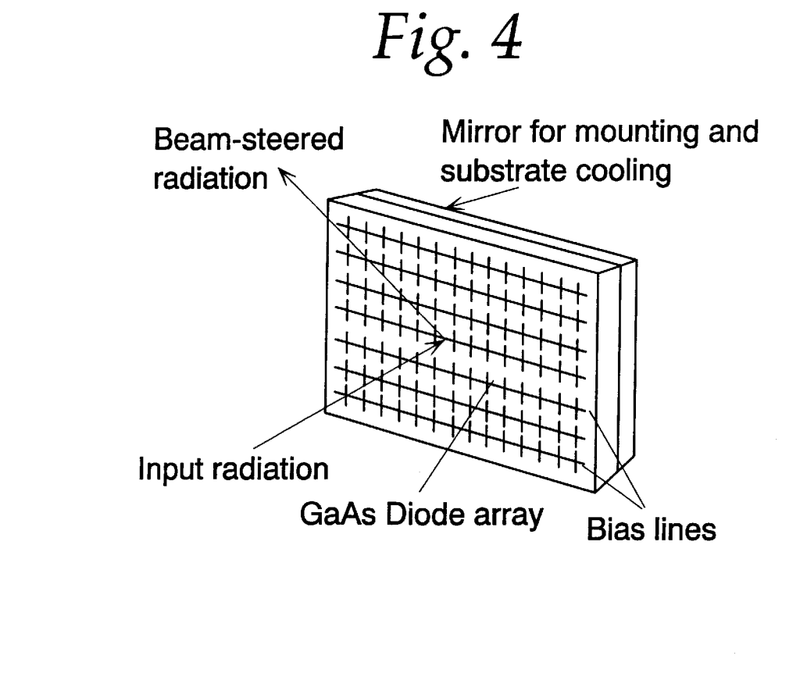
FIG. 4 is a schematic of a beam steering diode array embodiment of an electronic mirror.
Figure 5:
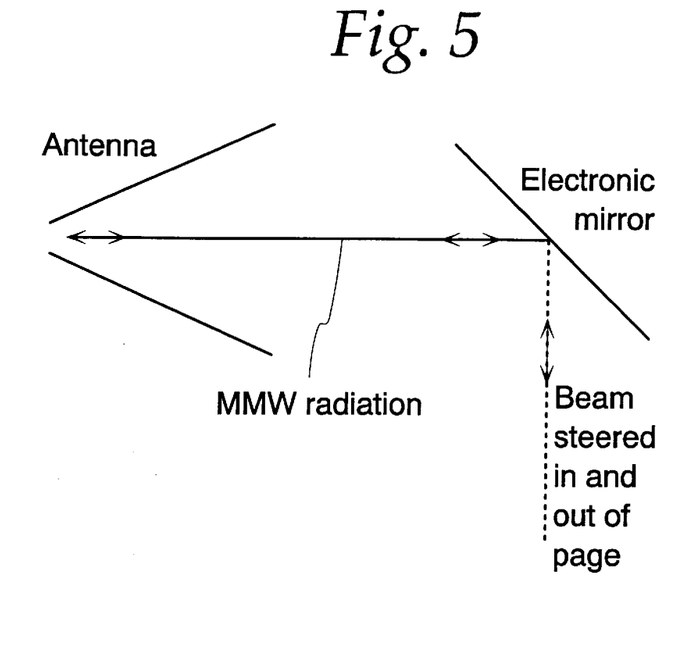
FIG. 5 is a schematic of a receiver/illuminator element.
Figure 7:
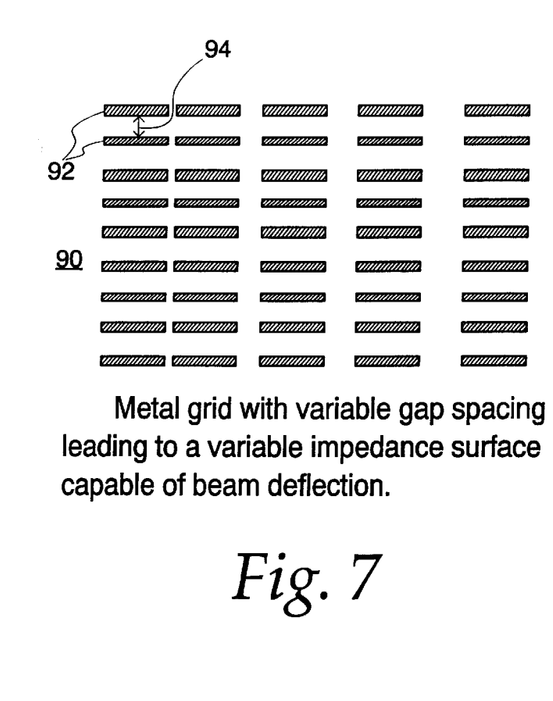
FIG. 7 is a schematic of a metal grid element of a GaAs electronic mirror.
Figure 8:
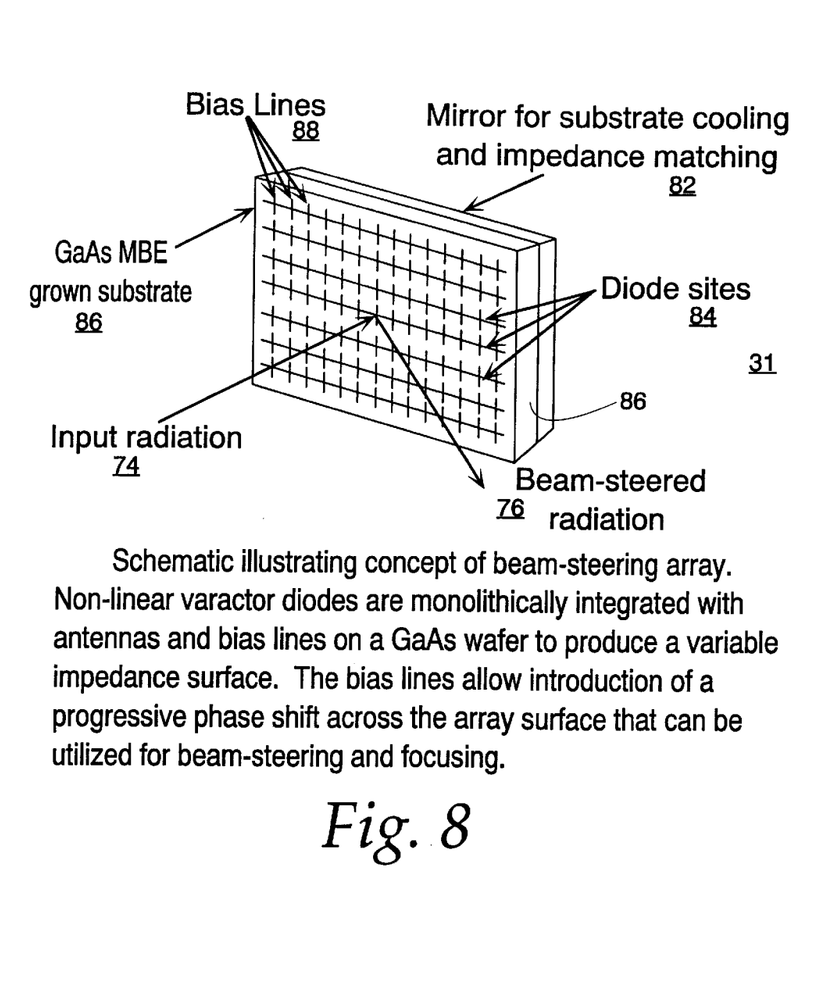
FIG. 8 is a schematic illustrating operation of an electronic mirror beam steering array.

Electronic mirror 31 is an important element of the MMW system 10. It serves multiple roles in the passive/illuminated imaging subsystem and the target designation subsystem. Referring to FIGS. 4, 7 and 8, preferably the electronic mirror 31 is a monolithic diode array of GaAs functioning as an active impedance surface. The GaAs diode array provides a low-cost, reliable device for phase front control and beam steering.

Electronic mirror 31 is based on the concept of a grid 90 of metal strips 92 with variable gaps 94, as shown in FIG. 7. The array impedance of the grid is a series LC circuit with the inductance from the metal strip elements and the capacitance from the gaps. The variable gaps introduce a variation in capacitance which results in a variable impedance across the surface of the array 90. This variation in impedance varies the reflection phase of an incoming radiation across the grid surface leading to beam deflection. This technique has been used to demonstrate beam-steering of a fixed thirty degree.

This technique is applied to electronic mirror 31. Electronic mirror 31 includes mirror 82 which provides substrate cooling and impedance matching to GaAs substrate 86. Substrate 86 is etched with bias lines 88 which act as the metal pieces in grid 90 of FIG. 7. Bi-stable varactor diodes 84 (which are preferably a modified hyperabrupt Schottky varactor diode) are added to the grid to allow electronic variation in the gap capacitance (between the bias lines), providing the necessary impedance control across the array. The phase of the reflected wave is then controllable everywhere on the array through biasing of the varactor diodes 84.

The electromagnetic wave is steered as a result of the progressive phase shift. The bias modifies the reactance which controls the reflected phase as shown in FIG. 8.

No waveguides, patch antennae or transmission lines are required. Any damage to individual diodes in the diode array will result in only minimal performance degradation since each mirror 31 will include thousands of diodes. A standard horn antenna 32 couples the detector (or illuminator) with the mirror 31. Using this technique, a 70 degree phase shift has been demonstrated at 94 GHz.

Figure 9:
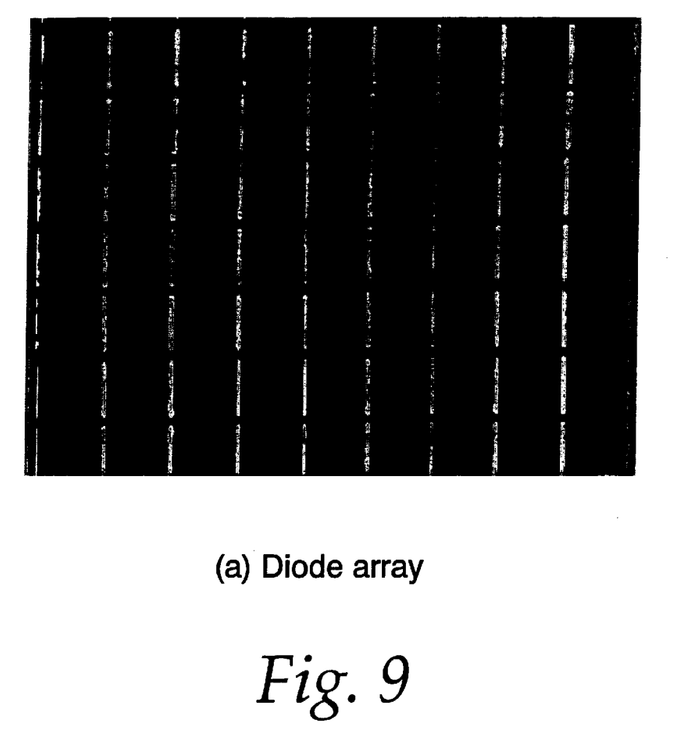
FIG. 9 is a photograph of a diode array for use in the electronic mirror of FIG. 8.
Figure 10:
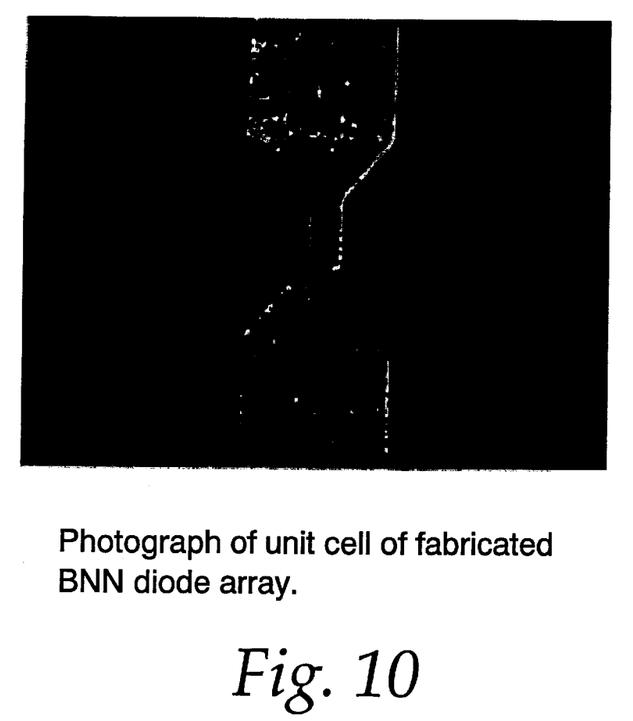
FIG. 10 is a photograph of a unit cell of a fabricated BNN diode array.

The preferred varactor diode 84 is a Schottky varactor diode. Alternatively, an anti-series biased diode (ABD)) may be used. The ABD employs an anti-series or back-to-back diode configuration which offers the potential for a very low diode series resistance by effectively eliminating the Ohmic contact and resulting losses from the RF path. FIG. 9 shows a portion of a diode array and FIG. 10 shows an individual diode element.

The millimeter wave targeting and imaging system 10 mounted on UAV 100 provides two levels of beam-steering/synthesis as shown in FIG. 3. UAV's are preferred because of their generally slow cruise speed. A downward looking subsystem can search directly below the UAV 100, avoiding to a large extent the shadowing inherent in low depression angle imaging systems. The total FOR for the downward looking subsystem is designated by numeral 110. The FOR beam steering capability provided by the electronic mirrors 31 enables a large search area coverage rate, for example, up to 2000 square kilometers per hour. After identification from an onboard search imagery or externally derived cues such as from a tactical control station, the target designator subsystem can form a 94 GHz real beam which provides an instantaneous FOV 112 on a target 120 within the total FOR 110. An advanced ordinance 114 with 94 GHz seeker capability can follow the scattered 94 GHz signal onto the target 120.

Within the instantaneous FOV of the individual antenna elements, standard interferometric imaging/sparse aperture techniques are used. A second level of electronic beam steering is implemented using the adjustable electronic mirrors to scan the instantaneous FOR across the desired total FOV. Thus, the number of receiver/antenna elements (which governs the cost and complexity of the system) is reduced by at least a factor of ten, while the total receiver area (which is inexpensive and does not affect system complexity) is increased, while maintaining system sensitivity and beam properties.

The downward looking imaging system uses an interferometric technique to form the images. In an aerial platform, such as UAV 100, the dominant phase error is induced by wing flexure. The tips of a UAV such as Predator built by General Atomics can have motions up to 18 inches which can result in phase errors of up to 140 wavelengths. The first correction for this source of phase errors are motion detectors 70, which comprise strain gages mounted in the wings and measure real time flexure of the wings. These measurements, together with a mechanical model of the wing shape as it flexes, provide an estimate of the phase error. After compensating for wing flexure, it is expected that the residual relative phase error from the mechanical measurement will be less than one wavelength ($2\pi$).

Roll and pitch of the UAV 100 can also cause large phase errors. In smooth air, such phase errors would be minimal. To compensate for roll and pitch, commercially available inertial navigation systems (INS) can be installed on each side of the fuselage and in the nose and tail section of the UAV 100. The INSs will provide information which can be correlated with the image to compensate for roll and pitch.

To reduce the total number of antenna elements which motion must be tracked, the antenna elements are mounted in clusters 20. Each cluster includes five receiver elements and one illuminator element and is mounted to a rigid, unloaded structure 50 so that the cluster elements move together. Also, each cluster 20 can further include additional vibration isolation (not shown) built into the rigid mount 50.

The motion detectors 70 provide a first order of phase correction. The next order of improvement in phase correction is accomplished in image processor 300 (see FIG. 13) using a phase closure algorithm commonly used in radio interferometry. The phase closure algorithm exploits the fact that in a system with N antenna elements, there are N−1 different phase error terms. Then after correlating each of the N elements with N−1 other elements, there are N(N−1)/2 measured correlation values, giving redundant measurements of the phase errors. An implementation of an algorithm employing this technique is found in "Unwrapping Algorithm for Least-Squares Phase Recovery from the Modulo-2pi Bispectrum Phase," by J. C. Marron et al., J. Opt. Soc. Am A 7, 14 (1990).

Any remaining phase errors can be corrected with well-known phase retrieval algorithms that use a priori constraints about the scene. A priori information includes such things as image non-negativity and maximizing image sharpness using one of the Muller-Buffington metrics points minimizes phase errors. Sharpness maximization requires only image structure, not prominent points. These algorithms will correct all sources of phase errors, besides the wing flexure and roll and pitch, including vibration, unknown internal path delays, phase stability of the local oscillator, and so on.

To form a quality image suitable for surveillance and target designation, all antenna elements must be calibrated relative to one another continuously. In general, MMW radiometers drift in gain with a characteristic time of the order of tens of seconds. The geometry of the downward looking subsystem makes calibration relatively straightforward. The signal $S_i$ for each radiometer is given by the relationship $S_i=G_i(T_{avg}+E_i)$, where $T_{avg}$ is the average effective temperature over the FOR of the radiometer, $G_i$ is the gain of the amplifier i, $E_i$ is the offset of amplifier i. Since each radiometer has essentially the same FOR, $S_{avei}=\int_\tau S_i dt/\tau$, which is approximately constant for all radiometers. Further, $\sigma_i^2 = \int_\tau (S_{avei}-S_i)^2 \, dt/\tau$, which is approximately constant, where $\tau$ is approximately ten seconds, which is less than the characteristic amplifier drift but long compared to an image time. This allows the determination of the relative gains and offsets of all the radiometers with minimal additional processor impact and/or additional hardware.

Figure 11:
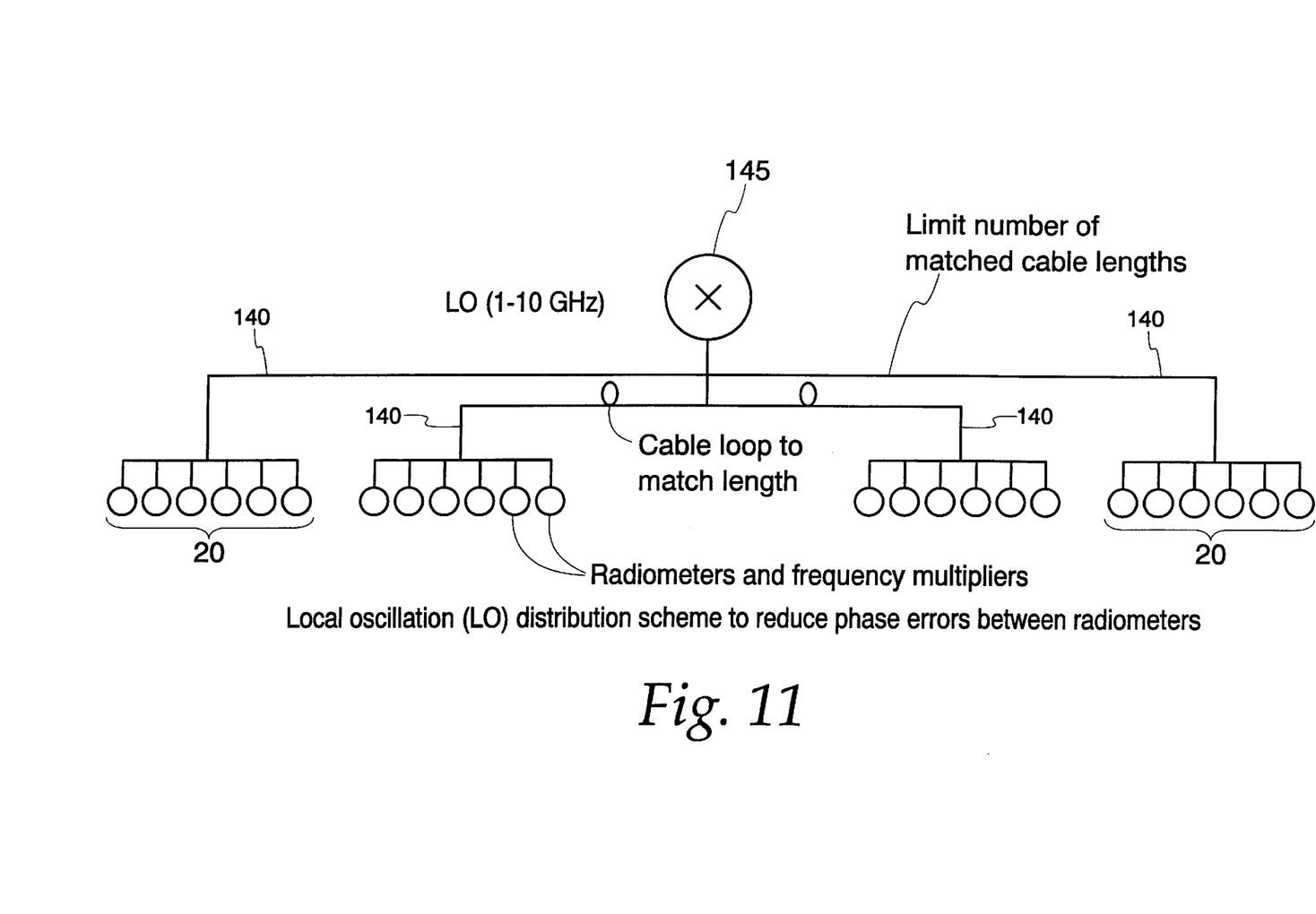
FIG. 11 is a distribution scheme for connecting millimeter wave radiometers.

Relative phase errors can occur in the distribution of the local oscillator and the signal paths, principally by temperature changes which cause differential expansion and contraction of the different lengths of cable connecting all the individual radiometer (antenna elements). These phase errors can be reduced by using a low frequency local oscillator source (from 1 to 10 GHz) distributed with a limited number of matched cable lengths to the clusters 20 of radiometers (antenna elements) and frequency multipliers within the clusters. Referring to FIG. 11, local oscillator 145 is connected to clusters 20 by matched cables 140. This arrangement reduces the phase error by greater than 100 over a standard local oscillator system and changes the temperature dependence to a temperature gradient across the aircraft. The phase error due to a temperature gradient is $\Delta\phi$, which is proportional to $\delta Tl/\lambda = 0.01$ radians, where $\delta T$ is the temperature difference across the aircraft (which for Predator is approximately 10 degrees Kelvin), l is the length of the cable between the radiometer and the local oscillator (which is approximate 7 meters) and $\lambda$ is the wavelength (which is approximately 3 centimeters). Thus the phase error in the analog signal path is reduced to being ignored by digitizing at the detectors.

After phase error corrections are made, the image can be further enhanced to improve image interpretability. The synthesized aperture is roughly the shape of a square in u-v space and consists of the scene distribution convolved with a sinc (sinx/x) impulse response. Each bright point in the image is surrounded by the side lobe pattern of the sinc function, which obscures nearby dimmer points. A Spatially Variant Apodization (SVA) algorithm developed by ERIM International effectively eliminates the side lobes.

Figure 12A:
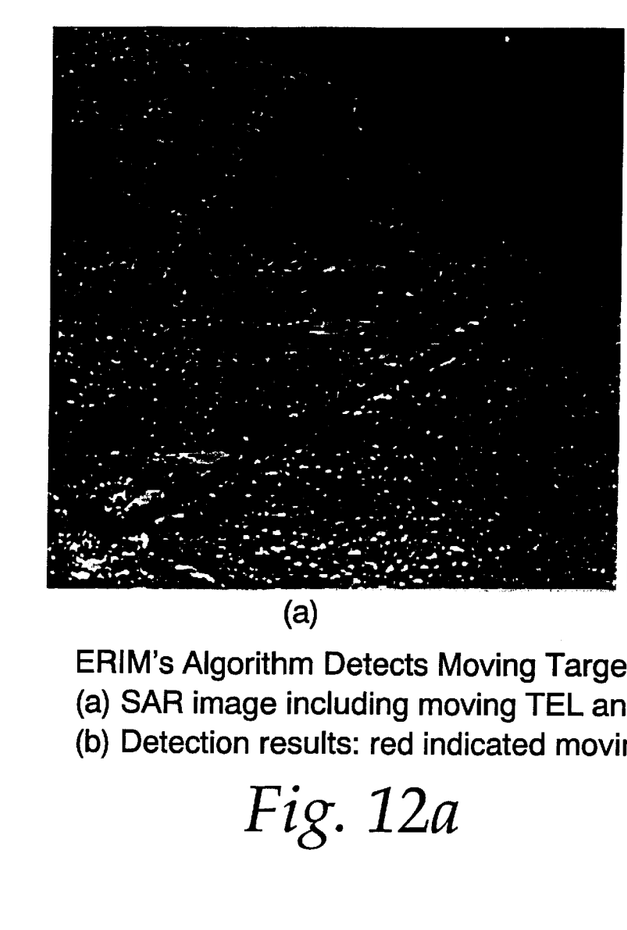
FIG. 12A is a SAR image of a moving target.
Figure 12B:
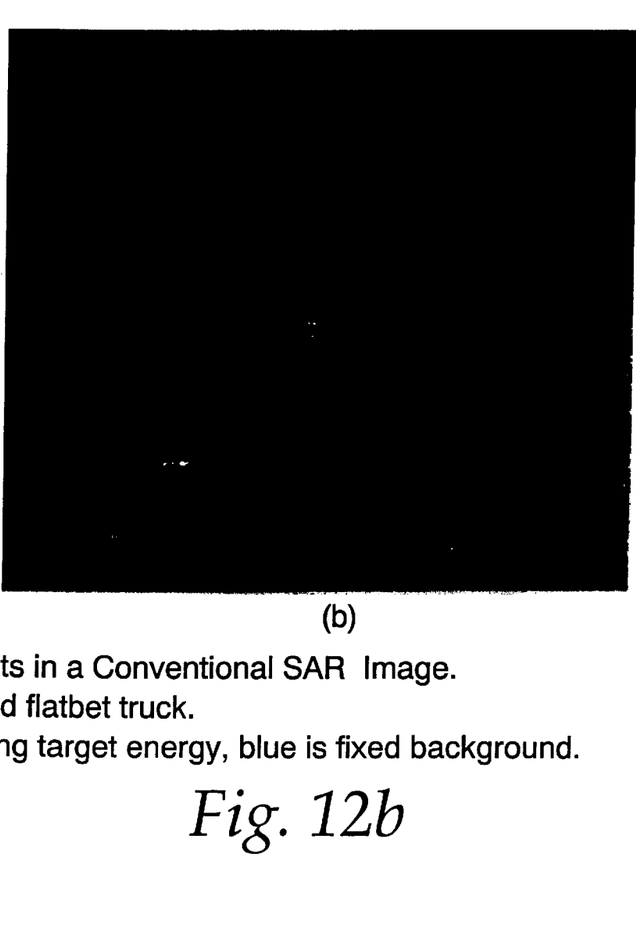
FIG. 12B is a detected image using the millimeter wave imaging system of FIG. 1.

System 10 can be operated as a target designator using a target designation algorithm such as the one described in "Detecting Moving Targets in SAR Imagery by Using a Phase-Error Correction Algorithm," by J. R. Fienup & A. M. Kowalczyk, Proc. SIPE 2487-30, Algorithms for Synthetic Aperture Radar Imagery II (April, 1995, pp 337–343). This algorithm is applied to the motion-compensated data so that fixed parts of the scene are in focus. Differences between the phase properties of the smeared images of moving targets and the in-focus image of the fixed background are used to distinguish moving targets from the background. FIG. 12a is a conventional SAR image including a moving TEL and flatbed truck. FIG. 12b shows the results using the above algorithm. The algorithm is sensitive to both along-track velocities and radial acceleration of the target, allowing detection in two directions.

Figure 13:
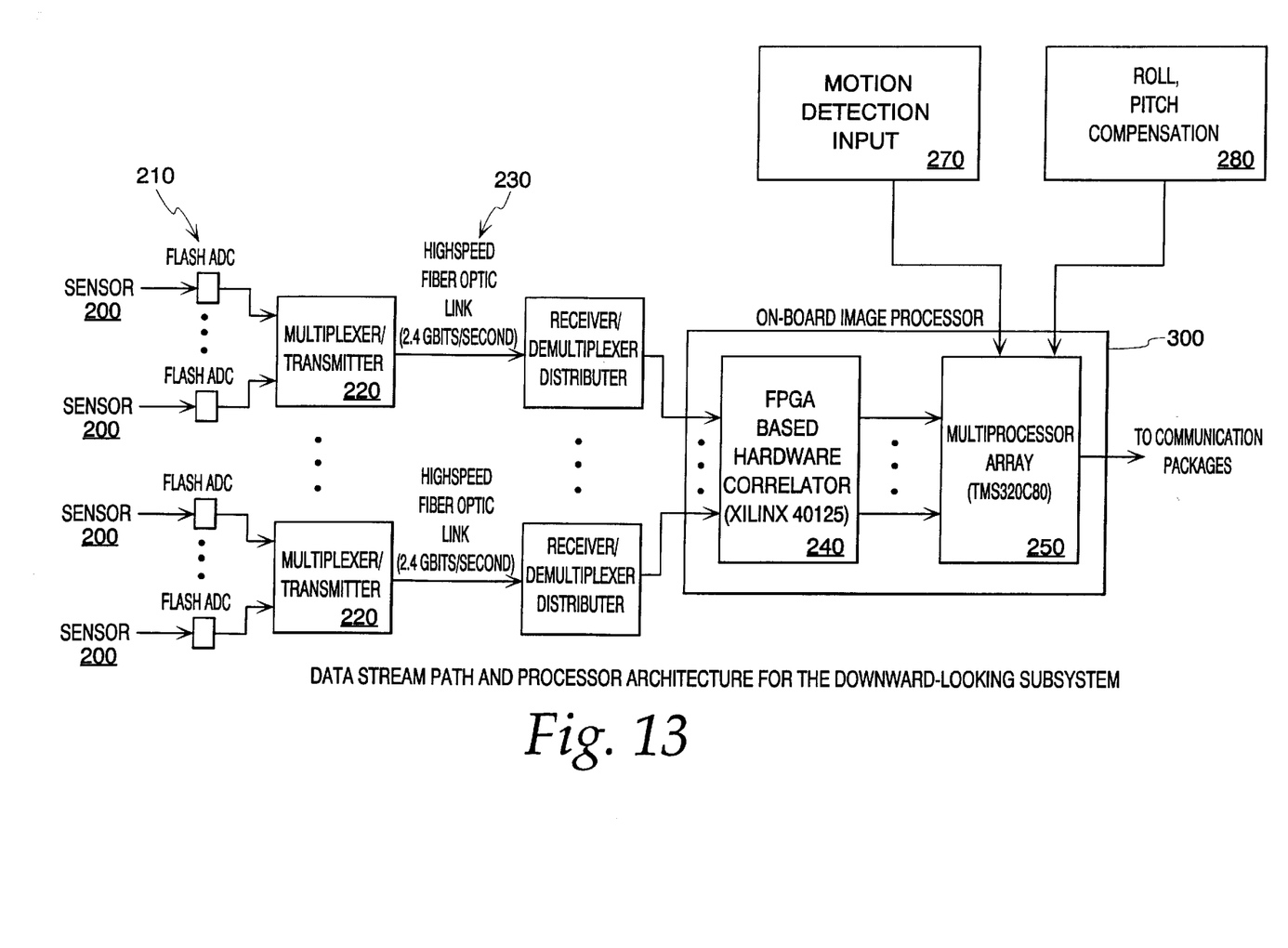
FIG. 13 is a block diagram of a data stream path and processor architecture for the millimeter wave imaging system of FIG. 1.

A block diagram of the data stream path and processing architecture of the system 10 is shown in FIG. 13. Each antenna element (whether configured as a receiver or an illuminator) 200 generates an analog signal which is provided to a flash analog to digital converter 210. The digital outputs of the flash ADCs are applied to multiplexers 220 which transmit the signals via high speed fiber optic link 230 to processor 300. Processor 300 includes a correllator 240, which is preferably a field programmable gate array (FPGA), Zilinx 40125, which correlates the individual signals and provided them to a processor array 250 which is preferably a DSP, TMS320C80. The TMS320C80 chips consists of four advanced computational units and a RISC master processor on a single chip. Each TMS320C80 delivers approximately two billion RISC-like operations per second. Processor array 250 correlates the output from the motion detectors (which has been previously correlated). The image output is then provided to a communication package or other electronics.

The amount of data generated by the preferred number of detectors, i.e. from 150 to 400, is in the range of one billion to one hundred billion, depending on the bandwidth of the receivers. The bandwidth of the receivers for passive operation is about 200 MHz and about 1 MHz for active operation.

The sparse array inversion requires of the order of $n^2$ correlations (for n detectors) at the bandwidth of the system. This corresponds to roughly $10^{13}$ correlations per second for 200 MHz bandwidth, 400 detector passive system and $10^{10}$ correlations per second for a 1 MHz, 150 detector illuminated system. To perform the necessary computations for calibration, motion compensation in real time, the computation engine is divided into two types of elements:

hardware-based elements that directly implement selected algorithms in hardware using parallel distributed arithmetic techniques, and conventional digital signal processor arrays that implement the remaining algorithms in software.

For example, the 3 bit correlations ($10^{13}$ calculations per second) will be performed in the FPGA 240. Image conversion ($4 \times 10^7$ calculations per second) will be performed in DSP 250. Motion compensation ($10^8$ calculations per second) will be performed in the DSP 250. Image enhancement ($2 \times 10^9$ calculations per second) will be performed in the DSP 250. Moving target indicator ($2 \times 10^7$ calculations per second) will be performed in the DSP 250.

The high sample rate of around 400 mega samples per second requires correspondingly fast flash ADCs 210 with a resolution of 3 bits. Preferably the flash ADCs 210 are integrated into the control electronics 36 of the antenna elements 30, 40 to reduce phase errors from analog data lines.

Control electronics 36 includes a receiver circuit for receiving the detected or reflected radiation. The receiver electronics may be constructed using discrete components or low noise 94 GHz amplifiers (LNA) and low noise mixers. MMIC LNAs using InP HEMP technology are preferred for their demonstrated noise of 4 dB with 22 dB gain at 94 GHz. This translates to a system noise temperature of 750 degrees Kelvin.

The illuminator elements 40 in the system 10 can be operated as a target designator subsystem. The transmitting antenna comprises an array of illuminator elements 40 arranged in a "T" or cross, similar to the imaging subsystem, but with fewer antenna elements. Output from the illuminators will also be correlated with the motion detection output.

An effective target designator requires a real beam to be formed on the target and the beam follows the target while the UAV and target move. To accomplish this and compensate for motion, the imaging subsystem operates at the same time as the target designator subsystem. A signal output of approximately one half a watt is needed for an advanced ordinance to identify a target from a distance of two kilometers in four millimeters/hour of rain at an altitude of 4.6 kilometers. The target designator signal is modulated in time to allow a positive identification of the target by the advanced ordinance. This will substantially increase the signal to noise ratio of the signal detected by the advanced ordinance and allow an image of the targeting area to be made during the off period of the target designator. The required target designator spot size of about 3 meters at 15,000 feet MSL requires an antenna diameter of about 5 meters at 95 GHz, or a 12 meter diameter antenna for a 2 meter spot at 25,000 feet MSL.

Temperature sensitivity affects scene contrast in a passive system. Temperature sensitivity in a passive interferometric imaging system depends on operational parameters of the aircraft platform, such as altitude h, ground speed, v, the required total sensor system FOR $\theta_r$ (in radians), as well as design factors such as total array diameter D, RF bandwidth B as shown in Equation 1. In Equation 1 allowance is made for multiple measurements of the same pixel, and for the need to scan the instantaneous FOV, resulting in a single expression which is applicable to most approaches to interferometric imaging.

$$\Delta T = T_{sys} \frac{D^2}{NR\lambda^2} \theta_r^{3/2} \sqrt{\frac{v}{Bh}} \quad (1)$$

where $R=d/d_0$, d is the diameter of the individual antenna elements, $d_0=\lambda/\theta_r$, N is the number of antennas within the sparse array, and $T_{sys}$=system noise temperature.

A difference between conventional approaches to conventional interferometric imaging and the approach used in MMW system 10 can be seen in the parameter R. In conventional synthetic aperture systems, the diameter of the antenna elements d is at most equal to $d_0$, the diameter which would result in an instantaneous FOV equal to the required total sensor system FOR, i.e. in a conventional system $R \leq 1$. In the system of the invention, d is chosen to be much smaller than $d_0$, such that $R >> 1$. In the preferred embodiment, d is about 4 centimeters.

Referring back to Equation 1, leaving all other parameters on the right hand side the same, an increase in R corresponds to improved, i.e. smaller $\Delta T$, temperature sensitivity. Thus, the system of the invention changes the system scaling such that there is a large net improvement in system performance. Similar improvement in performance in illuminated systems is also achieved.

The electronically beam-steered system according to the invention enables the number of receiver elements to be reduced significantly to practical levels, preferably in the range of from 150 to 400. In an airborne vehicle, weight and size are critical cost drivers. For a purely passive imaging system, a 400 element system can provide a temperature contrast ratio (target to background temperature difference, normalized to system $\Delta T$) between a metal target and terrain background of about 16 under adverse weather conditions (low lying stratus). In clear weather conditions, a contrast ratio of about 45 can be expected.

Using an adaptive image processing scheme improves the temperature sensitivity linearly with the spatial scale of the image feature. The use of adaptive processing provides temperature resolution of background features much better than that of small targets, improving target contrast and providing the capability to distinguish different types of terrain even under adverse weather conditions.

To improve image resolution, the system 10 has been augmented with active illuminators 40, i.e., a distributed set of random time and phase modulated transmitters integrated with the passive interferometric imaging system. The addition of an illuminator can enhance performance relative to that of a purely passive system. Image contrast can be enhanced by an order of magnitude or more for modest power levels. Electronic mirrors for beam steering and beam-steered receiver arrays can also be used with an active system, eliminating the grating lobe problem while maintaining spatial resolution.

The appearance of active and passive images can differ substantially, which difference can be used to improve image (or target) identification. The quasi-optical appearance of purely passive images is a result of random illumination from many angles, while an active system is illuminated from just one direction, leading to more radar-like signatures. Also, the contrast in an active system is the reverse of a passive imaging system. In an active system the image contrast of a target depends only the product of the signal to noise ratio (S/N) and the difference in reflectivity between the target and the background ($\Delta R$), where $\Delta R$ is the reflectivity difference between the target and the background.

Statistically independent (uncorrellated) signals from each scene element are required for the interferometric image reconstruction algorithm. At any instant in time the phase differences between sources generates a defined illumination pattern on the ground, but in the next instant the pattern has changed. As the process continues in time, the whole FOR will be randomly illuminated with a mean power level. In addition, multiple independent scatterers within the resolution spot size also help to generate uncorrelated signals.

Initial modeling based on weather models indicates that power levels of approximately 5 watts illumination leads to greater than an order of magnitude improvement in image contrast when compared with a purely passive system with the same number of receivers. However, actual performance gain is weather dependent. This performance gain can be used to improve image contrast, increase ground coverage rate, increase spatial resolution by increasing the diameter of the sparse antenna, increase platform altitude, reduce the number of receiver elements required and increase the image frame rate. Note that improvements in all of these parameters may be traded.

The millimeter wave imaging system includes a distributed set of random time and phase modulated transmitters which operate with the interferometric imaging system. Statistically independent (uncorrelated) signals from each scene element are provided (in accordance with a fundamental assumption in the interferometric image reconstruction algorithm). At any instant in time, the phase differences between sources generates a defined illumination pattern on the ground, but in the next instant this pattern has changed completely. As the process continues, the entire FOR will be randomly illuminated with a mean power level. In addition, multiple independent scatterers within the resolution spot size also help to generate uncorrellated signals.

The millimeter wave imaging system uses a singled pulsed source and a linear array of receivers along the aircraft structure, preferably the wing. This provides a symbiosis of a real multi-channel aperture and a synthetic aperture radar system. Preferably the receivers include large area antenna horns and electronic mirrors.

Alternatively, a radar approach uses a single pulsed source and a linear array of receivers along the wing in a symbiosis of a real multi-channel aperture and a synthetic aperture radar system. The receivers can be considered the passive section with large area antenna horns and electronic mirrors. A thumbnail sketch of the image forming processing algorithm is as follows. A one-dimensional image is formed from each receiver element in the direction of flight from the return signal by numerically deconvolving the expected impulse response function of a point target in the flight direction (i.e., with standard SAR processing). The array of one-dimensional images is then processed in the cross flight direction in a modified version of a spatial beam forming technique to yield a fully resolved two dimensional image of the ground area.

Preferably, to prevent transmit/receive leakage, standard radar gating techniques are employed. The sources for the illuminator elements is preferably solid-state amplifiers driven by a single low frequency source. Efficiencies of the order of 30–40% have been demonstrated for such multipliers, with output levels of the order of hundreds of milliwatts per source.

EXAMPLE SYSTEM

A preferred millimeter wave targeting and imaging system provides a FOR of plus or minus 22.5 to plus or minus 45 degrees and operates at from 15,000 feet MSL to 25,000 feet MSL. The system provides resolution of about 3 feet at the nadir (viewing angles off nadir will generally have reduced resolution because of the increase in range and the decrease in the effective area of the sparse antenna). The area of coverage at 3 feet resolution is about from 1000 to 2500 square kilometers per hour. The targeting mode provides a resolution of less than 3 meters at 15,000 feet and can be upgraded to less than 2 meters at 25,000 feet. Payload weight is from 80 kilograms to 100 kilograms with a volume of 0.2 to 0.25 cubic meters. Prime power draw is about from 0.6 kilowatts to 1.12 kilowatts. The aircraft platform travels at a preferred ground speed of from 35–50 meters per second (78 to 112 miles per hour). With the development of faster computer processing speed, the aircraft speed may also be increased. The diameter of each antenna element is about 6 centimeters. The number of receiver elements is from 50 to 400. Preferably 400 are used for passive operation; 50 to 100 for target designator or illumination.

The preferred system includes 50 illuminators, each having a diameter of about 6 centimeters. The overall antenna size is about 5 meters. The diameter of the illuminated spot at 4600 meters in altitude is about 3 meters. The first side lobe level is −7 dB compared to the main central lobe. Total power is 0.5 watts. A seeker munitions is assumed to have an antenna diameter of 25 centimeters. The target is assumed to have a radar cross section of 0.1 square meters. The estimated signal to noise ratio at a distance of 2 kilometers is 10.

Figure 6A:
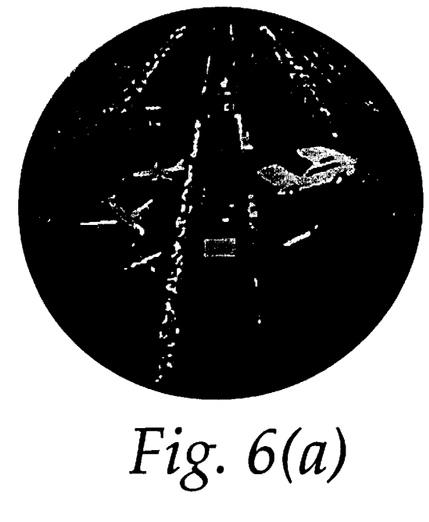
FIG. 6A is a photograph of a visible scene.
Figure 6B:
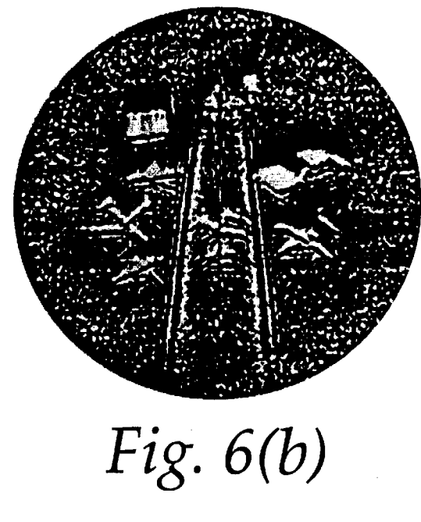
FIG. 6B is the same scene of FIG. 6A taken at 37 GHz using the millimeter wave imaging system of FIG. 1 and a far-field algorithm.
Figure 6C:
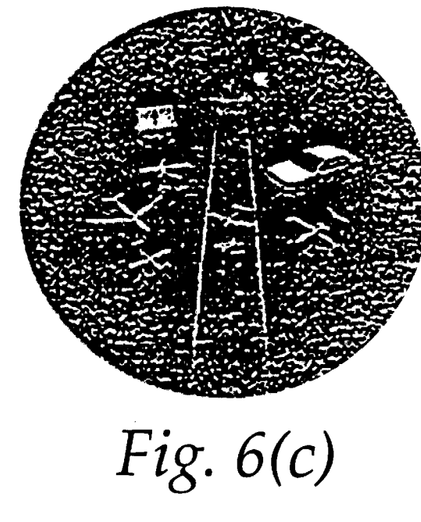
FIG. 6C is the same scene of FIG. 6A taken at 37 GHz using the millimeter wave imaging system of FIG. 1 and inverted with a near-field algorithm.

Measurements from a system 10 using a near-field algorithm compared to a far-field algorithm and a photograph are shown in FIGS. 6a, 6b and 6c. FIG. 6a is a photograph of a scene including a model airplane and a compact car. FIG. 6b is the same scene at 37 GHz taken with a sparse "T" array and inverted using a far-field algorithm. FIG. 6c is the same scene using a near-field algorithm.

While there has been illustrated and described a particular embodiment of the present invention, it will be appreciated that numerous changes and modifications will occur to those skilled in the art, and it is intended in the appended claims to cover all those changes and modifications which followed in the true spirit and scope of the present invention.

What is claimed is:

1. A millimeter wave imaging system, comprising:
   a plurality of millimeter wave radiometer elements, wherein each millimeter wave radiometer element comprises:
   a detector disposed within a horn antenna for detecting millimeter wave radiation;
   a receiver, responsive to the detector, for generating a receive signal; and
   an electronic mirror for steering millimeter wave radiation into the horn antenna, wherein the electronic mirror comprises an LC array of inductance and capacitance elements connected in series and disposed on a surface of the electronic mirror and a circuit for varying the reactance of the LC array effective for controlling a phase of the millimeter wave radiation; and
   a controller for correlating the receive signals and for generating an image corresponding to the received millimeter wave radiation;
   wherein the millimeter wave radiometer elements are located with respect to one another to form a sparse antenna array.

2. The millimeter wave imaging system of claim 1 wherein the millimeter wave radiometer elements are positioned on an airborne vehicle.

3. The millimeter wave imaging system of claim 2 wherein the millimeter wave radiometer elements are positioned on the fuselage and wings of an aircraft.

4. The millimeter wave imaging system of claim 3 wherein the radiometer elements are mounted with respect to one another or form a T or cross shaped array.

5. The millimeter wave imaging system of claim 4 wherein the radiometer elements are mounted in clusters.

6. The millimeter wave imaging system of claim 5 wherein the radiometer elements are mounted in clusters of 5 radiometers.

7. The millimeter wave imaging system of claim 6 wherein each radiometer element in a cluster is attached to a rigid support.

8. The millimeter wave imaging system of claim 7, further comprising a motion detection structure for detecting deflection of the aircraft.

9. The millimeter wave imaging system of claim 8 wherein the motion detection structure comprises at least two strain gages coupled to the aircraft.

10. The millimeter wave imaging system of claim 7, wherein each rigid support is coupled via motion deflection sensors to the aircraft and further comprising a circuit responsive to the motion deflection sensors for generating a signal representative thereof.

11. The millimeter wave imaging system of claim 1 further comprising a processing routine operable by the controller, comprising an interferometric technique for correlating the receive signals.

12. The millimeter wave imaging system of claim 1 wherein each characteristic dimension of each radiometer element is at least an order of magnitude smaller than the ratio of a system wavelength to a system field of regard.

13. The millimeter wave imaging system of claim 1 wherein the electronic mirror comprises a grid of metal strips disposed on a GaAs substrate and an array of diodes coupled to the metal strips for varying the reactance thereof.

14. The millimeter wave imaging system of claim 13 wherein the diodes comprise varactor diodes.

15. A millimeter wave imaging system, comprising:
   a plurality of passive millimeter wave radiometer elements, wherein each passive radiometer element comprises:
      a detector disposed within a horn antenna for detecting millimeter wave radiation;
      a receiver, responsive to the detector, for generating a receive signal; and
      an electronic mirror for steering millimeter wave radiation into the horn antenna, wherein the electronic mirror comprises an LC array of inductance and capacitance elements connected in series and disposed on a surface of the electronic mirror and a circuit for varying the reactance of the LC array effective for controlling a phase of the millimeter wave radiation;
   a plurality of active millimeter wave radiometer elements, wherein each active radiometer element comprises:
      a transmitter for generating a transmit signal;
      an illuminator, responsive to the transmit signal, disposed within a horn antenna for transmitting millimeter wave radiation; and
      an electronic mirror for steering millimeter wave radiation from the horn antenna, wherein the electronic mirror comprises an LC array of inductance and capacitance elements connected in series and disposed on a surface of the electronic mirror and a circuit for varying the reactance of the LC array effective for controlling a phase of the millimeter wave radiation; and
   a controller for correlating the receive and transmit signals and for generating an image corresponding to the received millimeter wave radiation;
   wherein the millimeter wave radiometer elements are located with respect to one another to form a sparse antenna array.

16. The millimeter wave imaging system of claim 15 wherein the millimeter wave radiometer elements are positioned on an airborne vehicle.

17. The millimeter wave imaging system of claim 16 wherein the millimeter wave radiometer elements are positioned on the fuselage and wings of an aircraft.

18. The millimeter wave imaging system of claim 17 wherein the radiometer elements are mounted with respect to one another or form a T or cross shaped array.

19. The millimeter wave imaging system of claim 18 wherein the radiometer elements are mounted in clusters.

20. The millimeter wave imaging system of claim 19 wherein the radiometer elements are mounted in clusters of 5 passive radiometers and 1 active radiometer.

21. The millimeter wave imaging system of claim 20 wherein each radiometer element in a cluster is attached to a rigid support.

22. The millimeter wave imaging system of claim 21, further comprising a motion detection structure for detecting deflection of the aircraft.

23. The millimeter wave imaging system of claim 22 wherein the motion detection structure comprises at least two strain gages coupled to the aircraft.

24. The millimeter wave imaging system of claim 22, wherein each rigid support is coupled via motion deflection sensors to the aircraft and further comprising a circuit responsive to the motion deflection sensors for generating a signal representative thereof.

25. The millimeter wave imaging system of claim 15 further comprising a processing routine operable by the controller, comprising an interferometric technique for correlating the receive signals.

26. The millimeter wave imaging system of claim 15 wherein a characteristic dimension of each radiometer element is at least an order of magnitude smaller than the ratio of a system wavelength to a system field of regard.

27. The millimeter wave imaging system of claim 15 further comprising a routine or operating the active radiometers as target designators.

* * * * *

UNITED STATES PATENT AND TRADEMARK OFFICE
CERTIFICATE OF CORRECTION

PATENT NO. : 6,154,174
DATED : November 28, 2000
INVENTOR(S) : Robin Terry Snider, et al It is certified that error appears in the above-identified patent and that said Letters Patent is hereby corrected as shown below:

Title page, item [75],
Change "Terry Lee Rhodes, Del Mar" to -- Terry Lee Rhodes, San Diego --

Item [75],
Change "Edward Joseph Doyle, San Diego" to -- Edward Joseph Doyle, Del Mar --

Signed and Sealed this

Second Day of October, 2001

Attest:

NICHOLAS P. GODICI
*Attesting Officer*   *Acting Director of the United States Patent and Trademark Office*